United States Patent [19]

Angermeier et al.

[11] Patent Number: 5,503,009
[45] Date of Patent: Apr. 2, 1996

[54] METHOD FOR RECOGNIZING IRREGULAR COMBUSTIONS IN A CYLINDER OF AN INTERNAL COMBUSTION ENGINE

[75] Inventors: Anton Angermeier; Manfred Wier, both of Landshut, Germany

[73] Assignee: Siemens Aktiengesellschaft, Munich, Germany

[21] Appl. No.: 367,763

[22] PCT Filed: Nov 12, 1991

[86] PCT No.: PCT/EP91/02140

§ 371 Date: Jun 3, 1993

§ 102(e) Date: Jun 3, 1993

[87] PCT Pub. No.: WO92/09874

PCT Pub. Date: Jun 11, 1992

Related U.S. Application Data

[63] Continuation of Ser. No. 70,420, Jun. 3, 1993, abandoned.

[30] Foreign Application Priority Data

Dec. 3, 1990 [DE] Germany ................. 90123131

[51] Int. Cl.$^6$ ................. G01M 15/00
[52] U.S. Cl. ................. 73/117.3
[58] Field of Search ................. 73/116, 117.3; 364/431.07, 431.08; 123/419, 436

[56] References Cited

U.S. PATENT DOCUMENTS 3,972,230  8/1976  Hanson et al. ................. 73/116
4,697,561  10/1987 Citron .
5,241,480  8/1993  Takaku et al. ................. 364/431.08

FOREIGN PATENT DOCUMENTS 2301691  9/1976  France .

OTHER PUBLICATIONS

Plapp et al., "Methods of On-Board Misfire Detection", Robert Bosch GmbH, Mar. 1990.

*Primary Examiner*—Robert Raevis
*Attorney, Agent, or Firm*—Hill, Steadman & Simpson

[57] ABSTRACT

The speed for each cylinder of an internal combustion engine is detected at two crankshaft positions (z1, z2) of a cylinder and an irregular combustion is recognized when the gradient of the speed curve falls below limit value GW.

4 Claims, 1 Drawing Sheet

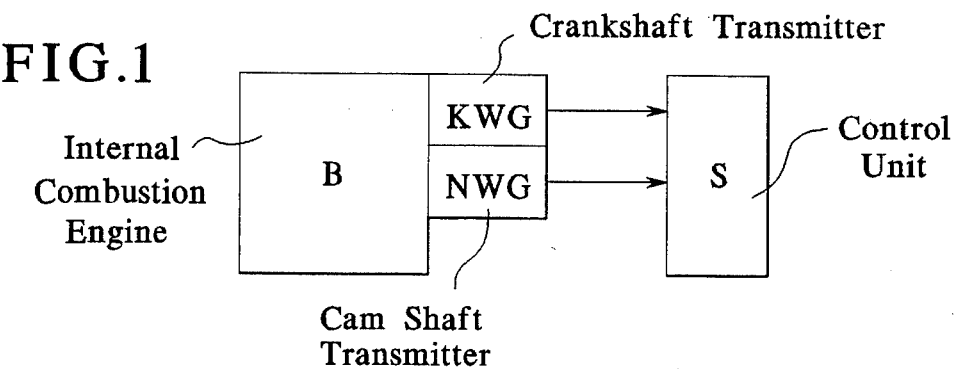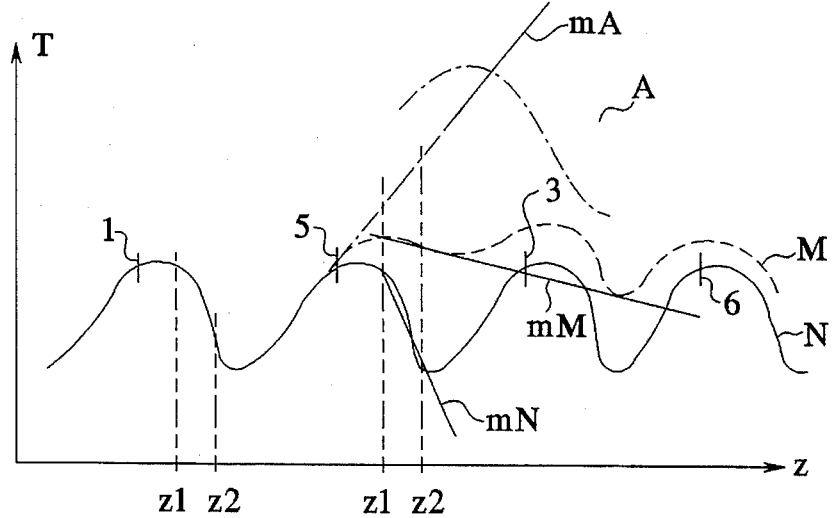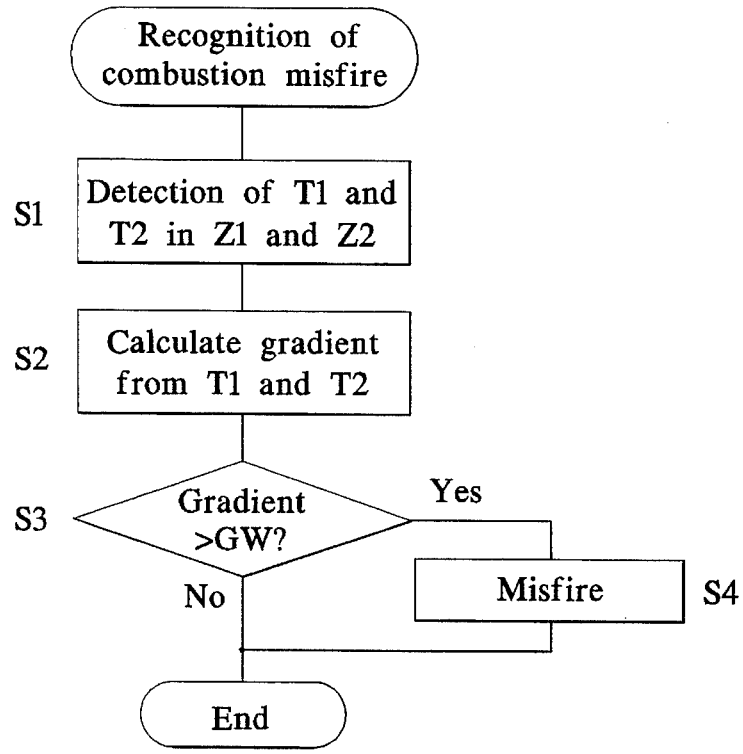

5,503,009

METHOD FOR RECOGNIZING IRREGULAR COMBUSTIONS IN A CYLINDER OF AN INTERNAL COMBUSTION ENGINE

This is a continuation of application Ser. No. 08/070,420, filed Jun. 3, 1993, now abandoned.

CROSS REFERENCE TO RELATED APPLICATION

A related application is international application PCT/EP91/02157, filed 15 Nov. 1991, and filed for entry into the U.S. national phase simultaneously herewith.

BACKGROUND OF THE INVENTION

1. Field of the Invention

The invention relates generally to a method for recognizing irregular combustions in a cylinder of an internal-combustion engine.

2. Description of the Related Art

U.S. Pat. No. 4,697,561 discloses a method in which the speeds for each cylinder are detected, during its work cycle, at the crankshaft positions in which the crankshaft is at the lowest and the highest speed respectively. The difference between these two speeds is a measure of the torque generated by the cylinder. This, when related to the averaged torque of all the cylinders, gives an indication of the operating efficiency of the cylinder in question, which is utilized for diagnostic purposes.

In this method, the crankshaft positions having the highest and the lowest crankshaft speed have to be determined experimentally on the engine test bench. Preferably, they are dependent on load and on speed and are stored in this dependence in the control unit for carrying out the method. These crankshaft positions have to be read out before each detection of speed. This means an increased outlay in terms of computing time in the detection of speed which in any case is critical with regard to time.

FR 2,301,691 describes a method for obtaining a measured quantity, indicating the approximation to a predetermined lean-running limit, during the operation of an internal-combustion engine.

For this purpose, a method and a device by which combustion misfires are to be recognized are described. For this, the crankshaft speed is measured at two points in time during the working stroke of a cylinder, one point in time being before the top dead center of combustion and the other being after the top dead center. The difference between the measured values is formed. These two measurements are made again during the next work cycle of the same cylinder. A difference is formed again from the two differences determined and a combustion misfire is recognized in the event of changes of these successively determined differences.

SUMMARY OF THE INVENTION

The object of the present invention is to describe a simplified method for recognizing combustion misfires, in which the outlay in terms of computing time is also reduced.

The solution according to the invention is achieved in a method for recognizing irregular combustions in a cylinder of an internal-combustion engine, the speed of the internal-combustion engine being determined for each cylinder at two crankshaft positions, at least one of the crankshaft positions being located after top dead center, a gradient of the speed curve, which is defined by the two speeds obtained, is respectively calculated from the two speeds obtained, and in that an irregular combustion is recognized when the speed gradient falls below a limit value. Advantageous developments of the invention are achieved when the speed for each cylinder is determined continuously over two crankshaft position ranges and one of the two speeds is obtained respectively from these by averaging. Preferably, the limit value is zero and the dropping of the speed gradient below the limit value is recognized by a change in the sign of the speed gradient. In a preferred embodiment, the limit value is varied depending upon the load and speed of the internal-combustion engine. A further development provides that the distance of the crankshaft positions from one another and from top dead center is varied depending upon load and on speed.

According to the invention, the speed for each cylinder is detected at two crankshaft positions, at least one or both crankshaft positions being located after the top dead center. An evaluatable speed difference must be present at these crankshaft positions, otherwise the positions are selectable at random.

During a proper combustion in a cylinder, some acceleration of the crankshaft must occur. If this does not occur or if it falls below a specific value, either no combustion at all or an insufficient combustion has taken place.

According to the invention, therefore, a speed gradient is determined from the two detected speeds. This speed gradient is compared with a limit value. When it exceeds the limit value, then there is a proper combustion. In contrast, when it falls below the limit value, then there is no combustion at all or an insufficient combustion.

As a result of the evaluation by means of the speed gradient, the crankshaft positions at which the speed is detected do not have to be displaced in dependence on load and on speed. They can be permanently selected independently of the operating conditions, since a speed gradient, in contrast to a speed difference, still allows evidence of a tendency even when the differences are very small.

According to a development of the invention, the speed can be detected over two crankshaft position ranges. One of the two speeds is then obtained respectively by averaging from these two crankshaft position ranges. The speed detection is thus less sensitive to disturbing influences.

BRIEF DESCRIPTION OF THE DRAWINGS

The invention is explained in more detail by means of the figures. Of these:

FIG. 1 shows a simplified block diagram of an arrangement for carrying out the method of the present invention, FIG. 2 shows a graph of a speed curve of the crankshaft of an internal-combustion engine to illustrate the method, and FIG. 3 shows a flow diagram for carrying out the inventive method.

DETAILED DESCRIPTION OF THE PREFERRED EMBODIMENTS

FIG. 1 shows an internal-combustion engine B with a crankshaft transmitter KWG and with a cam shaft transmitter NWG. The crankshaft transmitter senses a gear wheel which is connected to the crankshaft and which has a reference mark and a plurality of teeth. The crankshaft transmitter KWG each time supplies as an output signal one pulse per tooth and one reference pulse, distinguishable from this, at the reference mark. This output signal is fed to a control unit S which, by counting the pulses, on the one hand determines the position of the crankshaft within a revolution of 360° and on the other hand determines the speed by means of the time sequence of the pulses.

The cam shaft transmitter NWG senses a gear wheel which is connected to the cam shaft and which has a tooth over one half of its circumference and a gap over the other half of its circumference. The output signal from the cam shaft transmitter NWG has two states, depending on whether the tooth or the gap is located opposite the cam shaft transmitter NWG. The control unit S determines the cylinder assignment and the crankshaft angle by means of this output signal together with the output signal from the crankshaft transmitter KWG. The cam shaft transmitter NWG is used because, for example in a 6-cylinder engine, there is a periodicity of two respective revolutions and therefore the position of the crankshaft alone is not yet sufficient for a clear assignment in the ignition sequence.

The control unit S has essentially the function of controlling the ignition and injection for the internal-combustion engine B and of performing various diagnostic functions. For this purpose, various phase sensors and actuators, not shown, are connected to the control unit S. Such a control unit S therefore constitutes a conventional engine control, such as is already put into practice at the present time in many vehicles.

A diagnostic function executed by the control unit S is the recognition of irregular and combustions in one of the cylinders of the internal-combustion engine B. As an illustration, the reciprocal speed T of the crankshaft is plotted against the crankshaft position z in the graph of FIG. 2. The reciprocal speed was selected because a corresponding signal is already present in the control unit S. In comparison with a consideration of the speed, therefore, the conditions are reversed. Consequently, a rising edge thus signifies a slowing, and a falling edge an acceleration, of the crankshaft. A normal curve N reproduces this curve for the normal operation of the internal-combustion engine B. The sinusoidal curve results from the various work cycles of the internal-combustion engine B, the individual acceleration phases being respectively after the ignition of a cylinder during its work cycle. In FIG. 2, the top dead centers in the cylinders, 1, 5, 3, 6 are shown by way of example according to the ignition sequence in a 6-cylinder engine.

The conditions which occur when proper ignition and combustion of the mixture have not taken place during the work cycle of a cylinder are shown in FIG. 2 for the cylinder 5. A misfire curve A applies when no combustion at all takes place. The crankshaft is therefore not accelerated, but is slowed further as a result of the resistances of the engine. Only after the ignition of the next following cylinder 3 with a proper combustion is the crankshaft then accelerated again.

A deficiency curve M applies when a combustion admittedly takes place, but does not have the necessary intensity. The acceleration of the crankshaft occurring thereby can consequently only reduce the current deceleration or bring about only a low insufficient acceleration. The deficiency curve M shown in FIG. 2 is therefore only one example of such an irregular combustion. Any other curve between the misfire curve M and normal curve N is possible.

The method according to the invention for recognizing such irregular combustions is described by means of the flow diagram of FIG. 3. A corresponding program is filed in a diagnostic routine of the control unit S and is executed continuously for each cylinder.

For this purpose, two crankshaft positions $z1$, $z2$ are fixed in relation to the respective top dead center of a cylinder. In the example, these crankshaft positions $z1$, $z2$ are located after the top dead center and within the acceleration phase caused by the combustion. The crankshaft positions $z1$, $z2$ are determined by means of tests. The main factor in determining them is as accurately an evaluatable difference as possible of the reciprocal speed T in the two crankshaft positions $z1$, $z2$. In step S2, the gradient is then calculated from these two reciprocal speeds $T1$, and $T2$. These gradients are illustrated in FIG. 2 by the straight lines mN, mA and mM. Finally, a check as to whether this gradient is greater than limit value GW is made in step S3. If this is so, a misfire is recognized in step S4.

The choice of the limit value GW determines the extent to which only slightly irregular combustions are still to be recognizable. An especially simple method is a pure sign evaluation of the gradient. It can be seen from the example in FIG. 2 that a positive gradient is present in the case of the misfire curve A, and a negative gradient in the case of the normal curve N.

If a more exact evaluation of even only slightly irregular combustions is desired, the limit value GW is set to a specific negative value. It is thus possible also to recognize as irregular combustions which admittedly provide an acceleration contribution, but one which is insufficient in comparison with the conditions in the normal curve N. This limit value GW is again determined by means of tests.

The method described is usually sufficient to recognize irregular combustions with adequate accuracy. However, if greater disturbing influences are present in the signal evaluation, the method can be refined by various possibilities.

One such possibility is, instead of the reciprocal speed $T1$ at the crankshaft position $z1$ and the reciprocal speed $T2$ at the crankshaft position $z2$, to determine respectively a multiplicity of reciprocal speeds T and to determine the reciprocal speeds $T1$ and $T2$ from these by averaging. Any disturbing influences in detecting the reciprocal speeds $T1$, $T2$ are thereby compensated.

The normal curve N may be deformed in specific load and speed ranges as a result of vibrations, resonances, etc. This can be counteracted by a corresponding variation of the limit value GW in dependence on load and on speed. A further possibility for this would be to vary the distance of the crankshaft positions $z1$, $z2$ from one another and from the top dead center.

Although other modifications and changes may be suggested by those skilled in the art, it is the intention of the inventors to embody within the patent warranted hereon all changes and modifications as reasonably and properly come within the scope of their contribution to the art.

We claim:

1. A method for recognizing irregular combustions in a cylinder of an internal-combustion engine, comprising the steps of:

obtaining two rotational speed measurements of a crankshaft for each cylinder of an internal combustion engine at two respective crankshaft positions in an acceleration phase, at least one of said two crankshaft positions being located after top dead center for the cylinder, said two speeds defining a speed curve;

calculating a gradient of said speed curve from said two speeds, and recognizing an irregular combustion when said speed gradient falls below a predetermined limit value;

varying a distance of said crankshaft positions from one another and from top dead center depending upon load and on speed of the internal combustion engine.

2. A method as claimed in claim 1, wherein said step of measuring includes the steps of:

measuring the speed for each cylinder continuously over two crankshaft position ranges and averaging the continuously measured speed to obtain one of the two speeds.

3. A method as claimed in claim 1, wherein said limit value is zero and said step of recognizing is achieved by recognizing a sign of the speed gradient.

4. A method as claimed in claim 1, further comprising the step of:

varying said limit value depending upon a load and speed of the internal-combustion engine.

* * * * *